Nov. 19, 1968   C. E. BENNER   3,411,158
LENS RETAINING UNIT
Filed Feb. 17, 1966
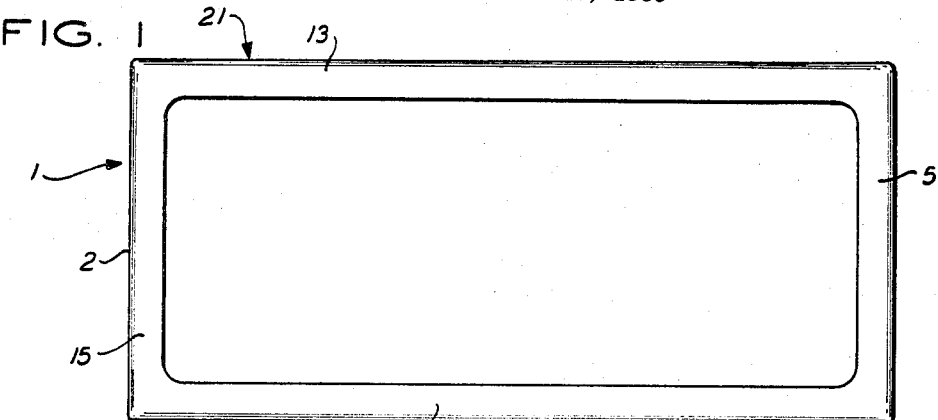
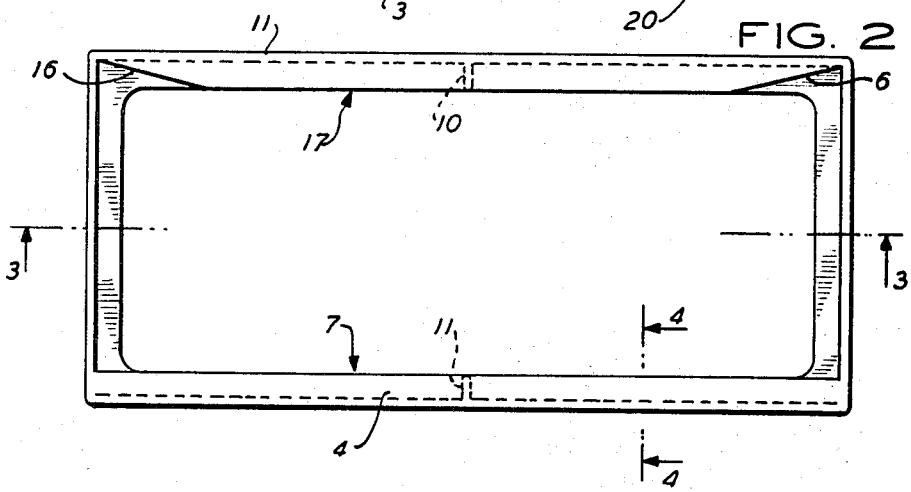
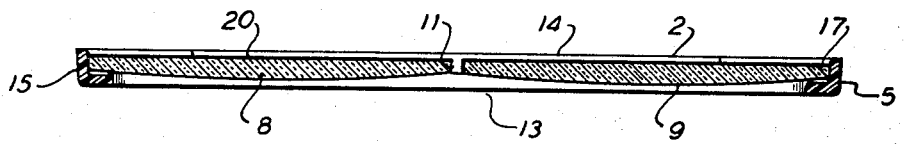
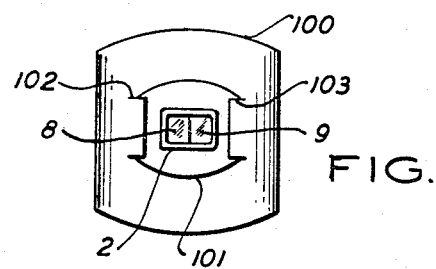
INVENTOR
CHARLES E. BENNER
BY
Jonathan Blunt
ATTORNEY

United States Patent Office 3,411,158
Patented Nov. 19, 1968

3,411,158
LENS RETAINING UNIT
Charles E. Benner, Grosse Pointe, Mich., assignor to Air Reduction Company, Incorporated, New York, N.Y., a corporation of New York
Filed Feb. 17, 1966, Ser. No. 528,281
1 Claim. (Cl. 2—8)

ABSTRACT OF THE DISCLOSURE

This disclosure is directed toward a protective eye shield wherein the frame for the retention of the transparent lens means is constructed of a deformable resilient material shaped to have inwardly directed channels for the retention of the lens means with the channels being shaped both for the purpose of fitting the contour of the lenses and for the purpose of permitting ease in the assembly and disassembly of the protective shield.

---

This invention relates to safety shields, and more particularly, to safety shields of the eye protective type. Such protective shields are normally used, for example in goggles or welders' hoods, and the like.

There are a number of problems in the protective shield designs of the prior art. For example, often the design is cumbersome in that it requires complicated structure to hold the transparent insert within the retaining frame of the shield. Furthermore, the complicated procedures necessary to install the transparent insert in the retaining frame of the prior art often lead to breakage or are otherwise disadvantageous.

It is an object of this invention to provide safety shield structure which allows for simple loading and unloading of the transparent insert within the retaining frame.

It is further an object of this invention to provide safety shield structure which provides for uncomplicated, yet rugged, retention of a transparent insert within a retaining frame.

It is further an object of this invention to provide safety shield structure in which multiple transparent inserts may be loaded into the retaining frame easily and thereafter used without cracking or chipping occurring because of abrasive contact therebetween.

It is further an object of this invention to provide a simple method of loading a transparent insert within a retaining frame to make up safety shield apparatus.

These and other objects and advantages of this invention as will hereinafter appear will become more apparent upon reading of the following more detailed description.

Generally, the protective shield is constructed of a retaining frame and a transparent insert or inserts secured therein. The retaining frame is deformable at least along one side thereof so as to allow easy loading of the transparent insert(s) therein. The retaining frame is channeled for reception of the insert(s) with notches cooperating with a channel and the deformable character of the frame to accomplish the easy loading and sure retention of the insert(s). These and other features of my invention will now be disclosed in detail in relation to the accompanying drawings, wherein an illustrative embodiment of the invention is disclosed. In said drawings:

FIGURE 1 shows the front view of a protective shield;
FIGURE 2 shows the protective shield shown in FIGURE 1 from a rear view;
FIGURE 3 shows the protective shield from a view taken of FIGURE 2 along lines 3—3;
FIGURE 4 is a detailed view of channel structure of the protective shield taken along line 4—4 of FIGURE 2; and
FIGURE 5 shows the protective shield mounted in a welders' face shield.

Like numerals in the different figures refer to corresponding parts throughout the drawings.

The protective shield 1 is shown as formed with a retaining frame 2 having front flanges 3 and 13 and rear flanges 4 and 14 on the sides thereof. At least flanges on one side, flanges 13 and 14, in the embodiment shown in the drawing, are deformable and resilient. As will become apparent, it is preferable that the frame is formed all at once, resulting in the fact that the entire frame will possess such deformable and resilient characteristic. Flanges 5 and 15 are shown as extending only at each end of the front side of the retaining frame 2 and include side walls, not numbered.

The channel 7 formed by the front and rear flanges 3 and 4 and side wall 20 is shown in FIGURE 4. Flanges 13 and 14 and side wall 21 (indicated in FIGURE 1) form a similar channel 17. Each side wall has an inner face with said faces forming a substantially rectangular configuration.

One of the two rear flanges of the retaining frame 2 (flange 14 shown in FIGURE 2) is notched at 6 and 16 at each end thereof. The notched flange, along with its counterpart in the front, as well as the adjacent side wall 21, is of the resilient and deformable characteristic discussed. Said notching 6 and 16 serves to cut away a portion of the rear flange 14 at each end thereof and allows for easy loading of the transparent insert as will be described hereinafter.

A single, or in the alternative, two transparent inserts, are retained in the frame 2. Two such transparent inserts 8 and 9 are shown in FIGURE 3. Said inserts are held in position within channels 7 and 17 against the front end flanges 5 and 15, as well as against the front and rear side flanges. It should be noted in FIGURE 3 that the retaining frame is preferably, although not essentially, constructed with front flanges 3 and 13, each having a spherical radius matching the spherical radius of the transparent inserts. This matching of spherical radius allows for sung fit of the inserts within the frame. It also allows for the best optical conditions, since the two inserts (1) sit flat against the rear flanges 4 and 14 (the inserts are held in that position by the curved flanges 3 and 13 bearing against the spherical surface of each insert as shown in FIGURE 3) and thus (2) are on the same plane. If a single insert is utilized, obviously only a single matching curved surface on front flanges 3 and 13 is required.

Ribs 10 and 11 advantageously are placed within the channels 7 and 17, preferably so as to be located on a common axis approximately equidistant from the ends of the retaining frame and generally perpendicular to the longitudinal axis of the frame. These ribs are employed in the frame to keep the transparent inserts 8 and 9 apart, so that they will not rub or abrase each other, causing chipping or cracking. When a single insert is contemplated, of course, the provision of the rib structure in the retaining frame is unnecessary.

The transparent insert or inserts are inserted into the retaining frame from the side. First the insert, whether it is the only insert to be inserted or just part of a final transparent paning made up of a number of inserts, is inserted into the channel 7 (opposite the channel 17 formed with the notched rear flange 14). Then channel 17 is deformed by pulling or pushing the flanges 13 and 14 away from the longitudinal axis of the frame, for insertion of the insert into that channel 17. The notches 6 and 16, one in each corner of the rear flange 14, eliminate interference of that rear flange with the insert in each corner when the channel is deformed and the insert loaded into the channel 17. When the flanges 13 and 14, and thus the channel 17, is released from its deformed position, the resilient retaining frame assumes its natural position and holds the transparent insert, which has been inserted therein, firmly in position. If a second insert is to be added located within the frame, it is added by the same procedure. The insert(s) may be unloaded from the frame in exactly the reverse procedure outlined above for loading.

The retaining case may be molded in one piece of any desired deformable but resilient material. The important consideration is that the one side (in the embodiment shown, flanges 13 and 14 and side wall 21 which form the channel 17) is of such material so as to be deformable (to load or remove the insert) and resilient, so that the channel will return to the normal insert holding position upon release from its deformed position. Polypropylene is desirable (although not essential) because of its resiliency and because the retaining case can be injection molded of that material in one simple operation.

The transparent insert(s) may be of any prescribed material such as glass or plastic, and may be a magnifying lens, if desired. The ribs 10 and 11, if employed, are molded as a part of the retaining frame at the same time that the rest of the frame structure is formed.

The retaining case with transparent insert firmly held therein is mounted on other structure for, for example, eye protection. As shown in FIGURE 5, for example, mounting of the frame 2 may be made on a welders' face shield 100 by a spring 101 held within notches 102 and 103 on the inside of the face shield. The head attaching structure for the shield 100 is not shown, for convenience of illustration.

The details of method and apparatus and method described above in relation to the drawings are not intended to limit the scope of my invention, since changes may be made therein by one normally skilled in the art without departing from the spirit of my invention. The scope of my invention should be limited only by the following claim.

I claim:
1. A face shield having an eye shield comprising a resilient frame construction and lens means therefor, said frame construction including side walls having inner faces, said faces forming a substantially rectangular configuration, each inner face having one first flange extending substantially perpendicular and inwardly therefrom, said first flanges being coplanar, one pair of opposed inner faces having second substantially perpendicularly inwardly extending flanges, said second flanges being coplanar, each of the other pair of opposed inner faces having at least one notch in at least one second flange tapering inwardly, said lens means comprising a pair of lens elements each having opposed faces and being held in position by said flanges, said first flanges of said one pair of opposed inner faces being curved to conform to their adjacent lens element faces and being in substantial contact therewith throughout the element length, said one pair of opposed inner faces having rib means extending inwardly therefrom between said first and second flanges thereof, and each lens element being initially inserted in said resilient frame construction between said first and second flanges of said one pair of opposed inner faces at a respective notch adjacent each of said other pair of opposed inner faces and being separated from the other lens element by said rib means.

References Cited
UNITED STATES PATENTS

| | | | |
|---|---|---|---|
| 2,093,620 | 9/1937 | Roessler | 40—209 |
| 2,263,116 | 11/1941 | Andrews | 2—8 |
| 2,827,722 | 3/1958 | Leclerc | 40—209 |
| 2,921,395 | 1/1960 | Fishman | 40—209 |
| 3,056,140 | 10/1962 | Lindblom | 2—14.8 |
| 3,225,357 | 12/1965 | Johnson | 2—14.9 |

HERBERT F. ROSS, *Primary Examiner.*